United States Patent [19]

Sumi

[11] Patent Number: 4,613,799
[45] Date of Patent: Sep. 23, 1986

[54] MOTOR VELOCITY CONTROL CIRCUIT

[75] Inventor: Yasuaki Sumi, Tottoru, Japan

[73] Assignees: Sanyo Electric Co., Ltd.; Tottori Sanyo Electric Co., Ltd., both of Japan

[21] Appl. No.: 545,393

[22] PCT Filed: Mar. 14, 1983

[86] PCT No.: PCT/JP83/00079

§ 371 Date: Oct. 17, 1983

§ 102(e) Date: Oct. 17, 1983

[87] PCT Pub. No.: WO83/03325

PCT Pub. Date: Sep. 29, 1983

[30] Foreign Application Priority Data

Mar. 18, 1982 [JP] Japan ................................. 57-44252
Apr. 26, 1982 [JP] Japan ................................. 57-70673
Apr. 26, 1982 [JP] Japan ................................. 57-70674
Jan. 12, 1983 [JP] Japan ................................. 58-3653

[51] Int. Cl.[4] .......................... H02P 5/00; H02P 5/16
[52] U.S. Cl. .................................. 318/314; 318/599; 318/318; 318/315
[58] Field of Search ............... 318/310, 311, 312, 313, 318/314, 315, 599, 608, 318

[56] References Cited

U.S. PATENT DOCUMENTS

| | | | |
|---|---|---|---|
| 3,097,267 | 7/1963 | Clark et al. | 318/314 X |
| 3,268,788 | 8/1966 | Branco | 318/313 X |
| 3,361,949 | 1/1968 | Brown et al. | 318/314 |
| 3,400,314 | 9/1968 | Wilson | 318/608 X |
| 3,495,208 | 2/1970 | Grada | 318/314 X |
| 3,500,162 | 3/1970 | Dyer | 318/314 |
| 3,753,067 | 8/1973 | Milligan | 318/314 |
| 3,967,177 | 6/1976 | Scholten et al. | 318/608 X |
| 4,072,884 | 2/1978 | Treadwell | 318/314 |
| 4,123,779 | 10/1978 | Goldschmidt | 318/314 X |
| 4,211,967 | 7/1980 | Akiyama et al. | 318/318 X |
| 4,314,188 | 2/1982 | Voigt | 318/314 X |
| 4,386,300 | 5/1983 | Ogawa | 318/314 |

FOREIGN PATENT DOCUMENTS

| | | | |
|---|---|---|---|
| 0022714 | 2/1977 | Japan | 318/314 |
| 0074810 | 6/1977 | Japan | 318/314 |
| 0189587 | 11/1982 | Japan | 318/314 |
| 0043196 | 3/1983 | Japan | 318/314 |
| 0159682 | 9/1983 | Japan | 318/314 |

Primary Examiner—William M. Shoop, Jr.
Assistant Examiner—Shik Luen Paul Ip
Attorney, Agent, or Firm—Darby & Darby

[57] ABSTRACT

A velocity control circuit for a motor 28 to drive a disc 2 of a constant linear velocity system, which phase-compares the reference frequency signal with a data signal reproduced from the disc 2 or a demodulated clock signal in synchronism with the data signal, whereby the phase comparison error output drive-controls the motor 28 including the starting thereof and the disc 2 is drive-controlled at constant linear velocity.

11 Claims, 11 Drawing Figures

MOTOR VELOCITY CONTROL CIRCUIT

TECHNICAL FIELD

This invention relates to a motor velocity control circuit rotatably driving a disc at constant linear velocity. This invention improves the method of picking up synchronous signals for driving the disc at constant linear velocity from the same on which are recorded the synchronous signals together with information signals, such as video, sound, etc. and aims at provision of a motor velocity control circuit for rotatably driving the disc including the motor starting period of time by phase-comparing data signal reproduced by the disc, or demodulated clock signal in synchronism with the data signal, and an output of a reference oscillator.

BACKGROUND ART

Recently, a compact disc digital audio system has been developed and in the limelight which records information signals, such as video or sound, in minute hollows (called the pits) on the disc and reads out and reproduces the recorded information by use of the ray, such as the laser ray, the disc being regulated to rotate at constant linear velocity so that the motor for rotatably driving the disc is adapted to be sequentially changeable of the number of rotations per minute following movement of a pickup.

Since the control signal controlling the motor is formed on the basis of data signal recorded on the disc, a method has been proposed which detects the synchronous signal with the longest data signal from the data signals reproduced by the pickup to thereby control the number of rotations of motor so that its time intervals are constant.

The above method includes a method of feeding to an integrated circuit the data signal detected from the disc to thereby detect the peak value by the longest synchronous signal, or that of picking up the longest synchronous signal of data signal by FM-detecting the data signal, the detection of peak value by the integrated circuit and pickup of synchronous signal by FM-detection being impossible during the start of motor, the pickup of data signal itself being almost impossible unless the disc is driven previously at constant linear velocity, thereby requiring another circuit which rotatably drives the motor by some way until it rotates at about the predetermined linear velocity during the starting. Therefore, the problem has been created in that the construction is complicated.

DISCLOSURE OF THE INVENTION

The data signal reproduced by the disc is distributed covering about 400 to 500 kHz around the frequency component of about 430 kHz on the basis of the coding system of compact disc digital audio system. Paying attention to the 430 kHz frequency spectrum, a means is provided which compares the data signal including a large amount of 430 kHz frequency component with the reference signal of reference oscillator, thereby driving and controlling the disc by error voltage of the comparison means at constant linear velocity including the start of motor.

A means to divide the data signal and reference signal is provided so that the dividing ratio of the dividing means changes during the start, the rotation at constant linear velocity and the stop of motor, so that the motor starts quickly, is rotated at constant linear velocity, and is stopped rapidly by the braking action of an electromagnet brake.

Also, at least one of the demodulated clock signal in synchronism with the data signal reproduced from the disc and reference signals of the reference oscillator, is compared by the comparison means through the dividing means, so that the error voltage can drive and control the disc including the starting of motor, and the dividing ratio of the dividing means is changed in the starting, rotation at constant linear velocity and the stop of motor, whereby it is possible to start the motor quickly and stop it rapidly. Paying attention to that when the motor rotates at constant linear velocity, the demodulated signal is multivibrating in the neighborhood of the central frequency of 4.3218 MHz, since the coding system of compact disc digital audio system standardizes that the data signal is of magnitude of 3 to 11 bits of 4.3218 MHz reference signal when the cycle period of demodulated clock signal becomes integer times as large as that of reference signal, the drive-control of motor to allow the demodulated clock signal to have the cycle period integer times as large as that of reference signal means the proper demodulation of data signal from the disc, whereby the disc can be driven and controlled at constant linear velocity, the demodulated clock signal being obtainable from a voltage controlled oscillator in multivibration in the neighborhood of the center frequency of 4.3218 MHz. The voltage controlled oscillator, however, has the follow-up capacity of several percent only with respect to fluctuation of data signal reproduced from the disc, which conversley means that the error voltage is low in comparison of the demodulated clock signal with the reference signal, whereby a range of motor speed variation is restricted and the disc reproduction characteristic is good.

Hence, a switching control circuit, which properly switches and outputs the data signal and demodulated clock signal, is provided to phase-compare the data signal reproduced from the disc with the reference signal during the starting of the motor and variation of rotational speed thereof except for when driven at constant linear speed, so that the motor is driven and controlled at constant linear speed corresponding to an error output resulting from the phase comparison, thereby expecting the drive-control of motor of good reproduction characteristic.

In the light of the above matter, this invention aims at the provision of a motor velocity control circuit for the motor to drive the disc at constant linear velocity by phase-comparison of data signal detected from the disc or demodulated clock signal in synchronism therewith with the reference frequency signal of the reference oscillator.

BEST MODE FOR CARRYING OUT THE INVENTION

Figure 1:
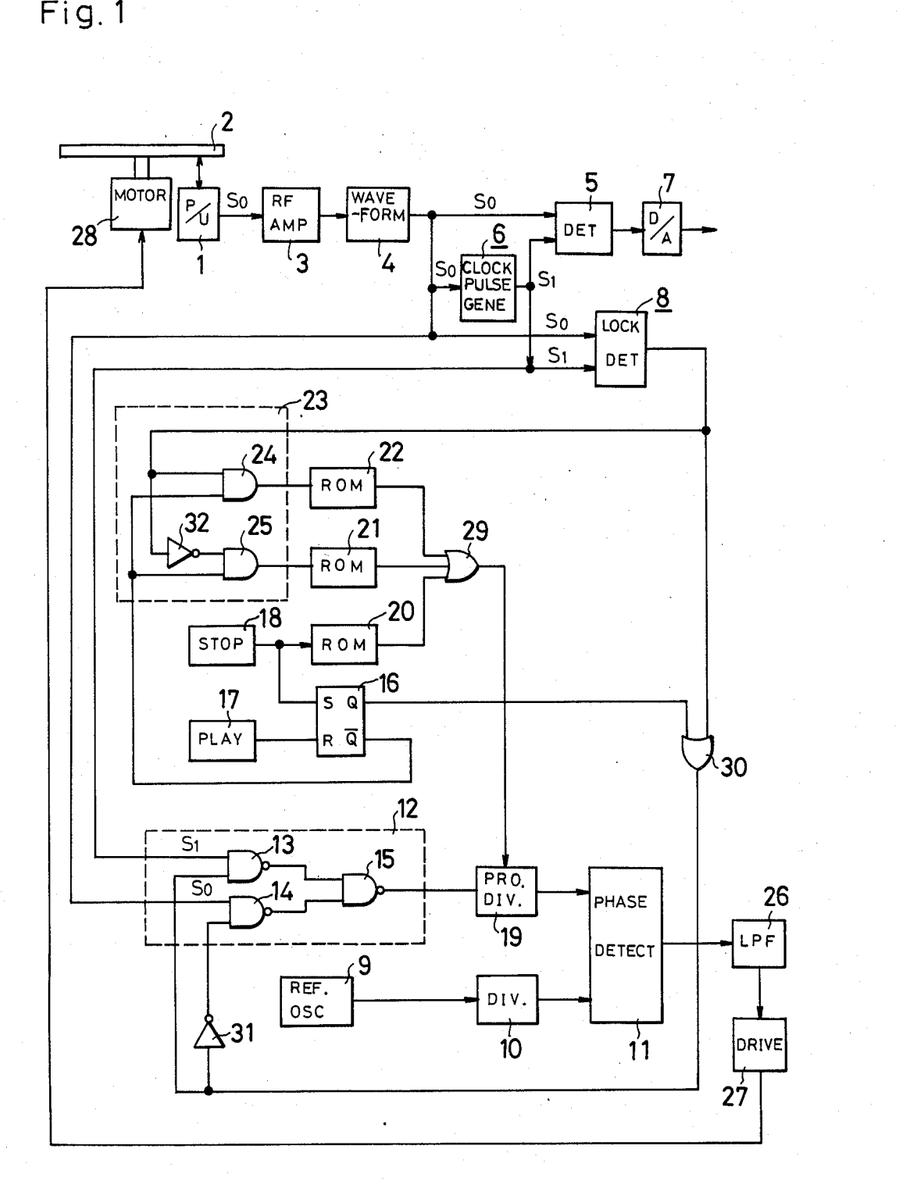
FIG. 1 is a block diagram of a first embodiment of a motor velocity control circuit.

The motor velocity control circuit of the invention is shown in FIG. 1, in which reference numeral 1 designate a pickup which projects the laser ray to a disc 2 to reproduce information recorded therein, a data signal $S_0$ detected by the pickup 1 being given to a demodulator 5 and a demodulated clock signal generator 6 through a radio frequency amplifier 3 and a wave-form shaping circuit 4. The modulated clock signal generator 6 is constructed to generate a demodulated clock frequency (of 4.3218 MHz) signal $S_1$ synchronized with the data signal $S_0$, the generated pulse output being given to the demodulator 5 in which the data signal $S_0$ is detected of its length on the basis of demodulated signal $S_1$, thereby outputting binary digit data corresponding to length of data signal $S_0$. The data detected by the pickup 1 is defined to be of 3 to 11 bits of reference frequency (4.3218 MHz) corresponding to the signal level, whereby the demodulator 5 outputs the binary digit data corresponding to length of data signal $S_0$, i.e., signal level.

Reference 7 designates an digital to analog (D/A) converter for converting the binary digital data from the demodulator 5 into an analog signal which is amplified by an amplifier (not shown) and thereafter reproduced by a loud-speaker. Reference numeral 8 designates a lock detector which is given the data signal $S_0$ and demodulated signal $S_1$ in synchronism therewith and detects the predetermined linear velocity rotation of disc 2, 9 designates a reference oscillator for oscillating the reference frequency (4.3218 MHz) signal, the output of oscillator 9 being divided to 160 by a frequency divider 10 to thereby feed the reference signal of about 27 kHz to a phase comparator 11, 12 designates a switching control circuit comprising a NAND gate 13 whose one input is given the demodulated clock signal $S_1$ and the other input given an output of lock detector 8, a NAND gate 14 whose one input is given the data signal $S_0$ and the other input is given an inverter output of lock detector 8, and a NAND gate 15 which is given two outputs of NAND gate 13 and NAND gate 14, the switching control circuit being adapted to output the demodulated clock signal $S_1$ and data signal $S_0$ switched properly by the output of lock detector 8. 16 designates a flip-flop which is reset by operating a play key 17 and set by operating a stop key 18 and stores the memory state, and 19 designates a programmable divider which sets the dividing ratio data of ROM20 in which the dividing ratio data "100" is stored by operation of stop key 18 and sets properly selectively by a selector 23 the outputs of ROMs 21 and 22 in which the dividing data "16" and "160" are stored by operation of play key 17. The selector 23 comprises an AND gate 24 which is given to the first input the $\overline{Q}$ output of flip-flop 16 and to the second input the output of lock detector 8 and an AND gate 25 which is given to the first input thereof the $\overline{Q}$ output of flip-flop and to the second input the inverter output of lock detector 8, and selects ROMs 21 and 22 properly by the output of lock detector 8 to thereby select the dividing data to be set in the programmable divider 19. A phase comparator 11 is given two outputs of dividers 10 and 19 so as to generate error voltage corresponding to the phase difference between both the inputs. 26 designates a low-pass filter which generates DC voltage corresponding to the error voltage from the phase comparator 11 so that the output of the same is adapted to be given and control the number of rotations of motor 28.

In addition, reference numerals 29 and 30 designate OR gates and 31 and 32 designate inverters.

Figure 2:
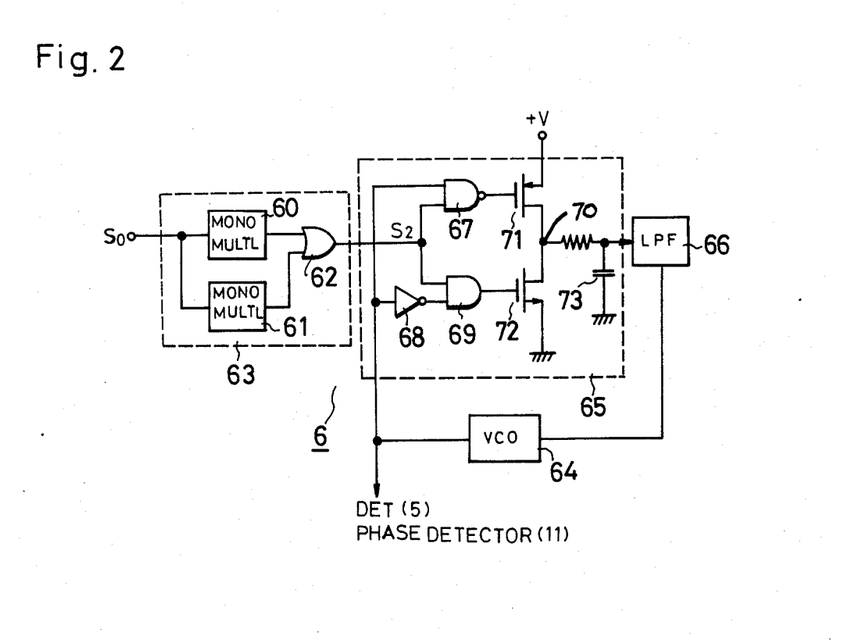
FIG. 2 is a block diagram of a modulated clock signal generator in FIG. 1, FIG. 3 an output wave form chart of the principal portions of the modulated clock signal generator in FIG. 2.

FIG. 2 is a block diagram of the demodulated clock signal generator 6 shown in FIG. 1. The demodulated clock signal generator 6 comprises; a pulse oscillator 63 comprising a one shot multivibrator 60 operating at the leading edge of data signal detected by the pickup 1, a one shot multivibrator 61 operating at the trailing edge of the same, and an OR gate 62 given the outputs of both the one shot multivibrators 60 and 61; a phase comparator 65 given the output $S_2$ of pulse oscillator 63 and that $S_1$ of a voltage control oscillator 64 in multivibration of the frequency near the reference frequency; and a low-pass filter 66.

The phase comparator 65 comprises a NAND gate 67 supplied at one input with the output $S_2$ of pulse oscillator 63 and at the other input directly with the output $S_1$ of voltage control oscillator 64, and AND gate 69 given the output $S_1$ through an inverter 68, a P-channel field-effect transistor (FET) 71 constituting a charge pump 70 supplied at the gate electrode with the output of NAND gate 67, and a N-channel FET 72 supplied at the gate electrode with the output of AND gate 69, so that charge-discharge control of a capacitor 73 connected between the node of FETs 71 and 72 and an earth, controls voltage across the terminals of capacitor 73.

Figure 3:
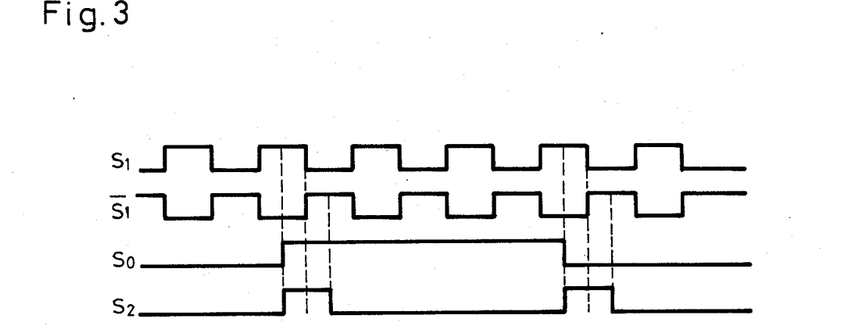

Therefore, the data signal $S_0$ detected by the pickup 1, when given to the demodulated clock signal generator 6, allows the phase comparator 65 to phase-compare the output $S_2$ of one shot multivibrator 60 operating at the leading edge of data signal $S_0$ with that $S_1$ of voltage control oscillator 64 in multivibration, at which time if both the outputs are locked of phase, the phase comparator 65, as shown in FIG. 3, detects by the NAND gate 67 the coincidence of output $S_2$ of one shot multivibrator 60 with that $S_1$ of voltage control oscillator 64. Although, at this time, the P-channel FET 71 is conductive to charge the capacitor 73, when the coincidence of output $S_2$ of one shot multivibrator 60 with inverter output $\overline{S}_1$ of voltage control oscillator 64 is detected subsequently by the AND gate 69, since the N-channel FET 72 is conductive to discharge the capacitor 73, the time periods for discharge and charge, when phase in locked, become the same, whereby the capacitor 73 consequently is not changed in potential.

However, when the phase shifts, a difference is produced between the periods of time for charge and discharge to change potential of capacitor 73 so that voltage corresponding to the voltage difference is given to the voltage control oscillator 64 through the low-pass filter 66, thereby controlling the frequency of voltage control oscillator 64 to be of zero phase difference. Also, even at the trailing edge of data signal $S_0$, the aforesaid phase comparison is carried out between the output $S_2$ of one shot multivibrator 61 and the oscillation frequency $S_1$ of voltage control oscillator 64 to thereby carry out phase matching of voltage control oscillation frequency and data signal $S_0$, thus obtaining from the voltage control oscillator 64 the demodulated clock signal synchronized with data signal $S_0$.

Figure 4:
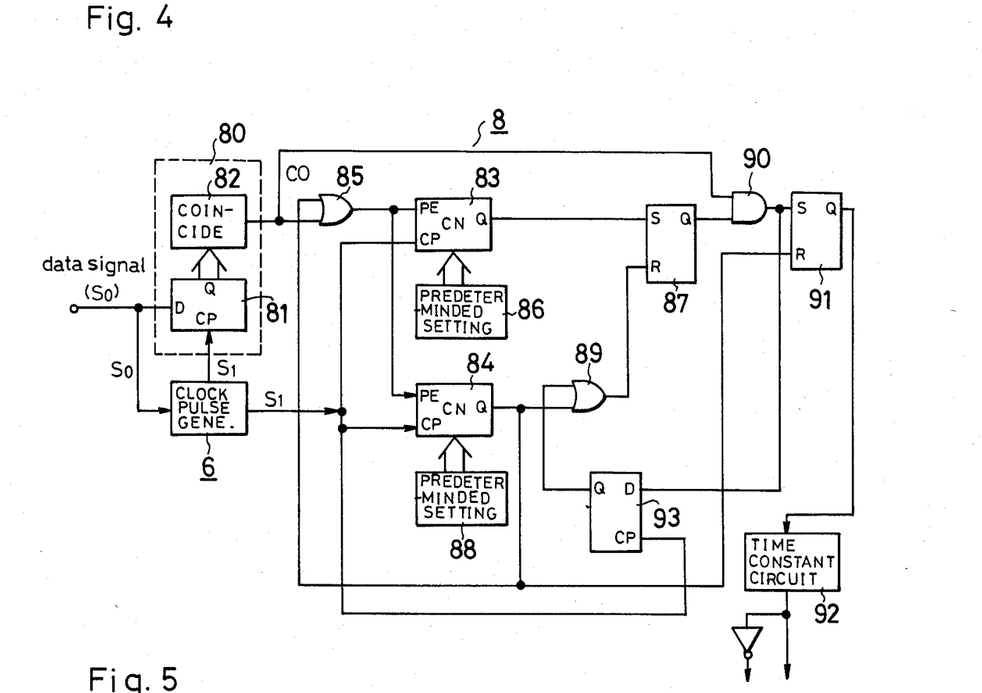
FIG. 4 is a block diagram of a lock detector in FIG. 1.

Next, in FIG. 4 of block diagram of the lock detector 8 shown in FIG. 1, reference numeral 80 designates a frame synchronous signal detector detecting the frame synchronous signal pattern, i.e., the 24 bit frame synchronous signal pattern, of data signal reproduced from the disc 2, the detector 80 comprising, for example, a 24 bit shift register 81 and a coincidence circuit 82 to which specific data set to the coincidence circuit 82 being coincident with each other to generate a coincidence output "CO". Reference numerals 83 and 84 designate programmable down counters having preset enable terminals (PE) preset by the output of an OR gate 85 and clock pulse input terminals (CP) given demodulated clock signal $S_1$ respectively. The predetermined number "588−10=578" is preset to the programmable down counter 83 by a predetermined-number setting circuit 86 so that logic "1" is sent to the output terminal Q by down count to set the flip-flop 87. Similarly, the predetermined number "588+10=598" is preset to the programmable down counter 84 by a predetermined-number setting circuit 88; the Q output of counter 84 being given as a first input to OR gate 89, an output thereof being given to a reset terminal R at a flip-flop 87. Reference numeral 90 designates an AND gate whose one input is given the output of frame synchronous signal detector 80 and the other input the output Q of flip-flop 87, and 91 designates a flip-flop having a set terminal S given the output of AND gate 90 and a reset terminal R given the output Q of programmable down counter 84, the Q output of flip-flop 91 being supplied to the switching control circuit 12 in FIG. 1 through a time constant circuit 92 comprising an integration circuit.

Reference numeral 93 designates a D-flip-flop which has a data input terminal D given the output of AND gate 90 and a clock pulse input terminal CP given the demodulated clock signal $S_1$ and supplies its Q output as a second input to OR gate 89. Also, the programmable down counters 83 and 84 are so constituted that the predetermined number is preset by the down count output Q of "598" through OR gate 85.

Figure 5:
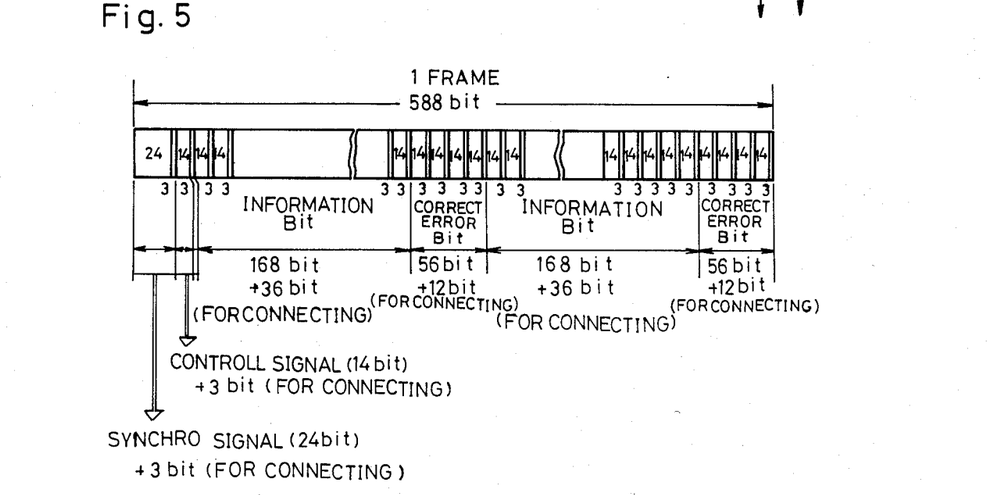
FIG. 5 is a structural view of a frame data.

Here, the frame data, as shown in FIG. 5, comprises the synchronous pattern signal bit of 24 bits absolutely not-appearing in EFM (Eight to Fourteen Modulation) at an information unit of 588 bits, the information bit of 336+72 bits (for connection), and the error correction bit of 112+24 bits (for connection), so that the data comprises 14 bits and between the data blocks is inserted the channel bit of 3 bits.

Hence, the frame data shown in FIG. 5, when fed successively to the frame synchronous signal detector 80, is shifted successively and stored on the basis of demodulated clock signal $S_1$.

Then, the coincidence output logic "1" is sent out by detecting the 24 bit frame synchronizing signal, the longest synchronous signal of data signal absolutely not appearing in EFM. The coincidence signal logic "1" sent out enables the programmable down counters 83 and 84 to be preset, whereby the predetermined number setting circuits 86 and 88 preset the predetermined numbers respectively. Then, the demodulated clock signal seccessively downcounts the number and at the down count of "588−10=578" the logic "1" output is given to the flip-flop 87 to be set. Accordingly, the AND gate 90 becomes stand-by to detect the synchronous signal for the subsequent frame.

Next, explanation will be given on the cases where the frame synchronous signal is extracted and not so.

(i) The case where the frame synchronous signal is extracted

When AND gate 90 in stand-by for frame synchronous signal detection is given the coincidence output "CO" from the frame synchronous signal detector 80, AND is effected to set the flip-flop 91 to thereby feed the signal "1" to the switching control circuit 12. Then, the "1" output from the D-flip-flop 93 at one lock later resets the flip-flop 87 through OR gate 89, whereby the AND gate 90 in stand-by for the synchronous signal detection is not conductive to release the stand-by for detection of synchronous signal. Furthermore, the coincidence signal "CO" presets the programmable counters 83 and 84 through the OR gate 85. Hence, the predetermined number "588+10" is newly set in the programmable down counter 84 until the down count output Q of "588−10" is generated from the programmable down counter 84, and the down counting of programmable down counters 83 and 84 by the demodulated clock signal $S_1$ is carried out after the above preset. Then, at down count of "588−10=578", the programmable down counter 83 feeds the down count output Q=logic "1" to the flip-flop 87 and sets it, thus again putting the AND gate 90 in the stand-by for detecting the synchronous signal.

(ii) The case where the frame synchronous signal is not extracted

When the coincidence output "CO" is not generated from the synchronous signal detector 80 for the period of time of "588+10" down count by the programmable down counter 84 to the AND gate 90 put in standby for detecting the synchronous signal by the down count output Q from the programmable down counter 83, the down count output Q of "588+10" of programmable down counter 84 forcibly presets the programmable down counters 83 and 84 through the OR gate 85. At the same time, the flip-flop 91 is reset, but not immediately to the switching control circuit 12 due to existence of time constant circuit 92. Hence, the logic "1" signal is generated from the lock detector 8 for the time period of maintaining voltage by the time constant circuit 92 and the demodulated clock signal $S_1$ is given to the programmable divider 19. In a case where the frame synchronous signal is not detected by the synchronous signal detector 80 for the time period longer than that of keeping voltage of time constant circuit 92, the output of lock detector 8 is inverted to thereby switch the output of switching control circuit 12 to the data signal $S_0$.

Accordingly, when the rotation of disc 2 exceeds the range of follow-up capacity of voltage control oscillator, the data synchronous signal cannot be properly demodulated, thereby carrying out no extraction of synchronous signal and generating no coincidence output "CO", thus making the AND gate 90 not-conductive. As a result, the flip-flop 91 is not set.

The abovementioned operation is carried out continually during the rotation of disc 2.

Next, explanation will be given on how to control the speed of motor by the data signal $S_0$ reproduced from the disc 2 and by the reference oscillator 9 and how to control rotation of disc 2 at constant linear speed.

Figure 6:
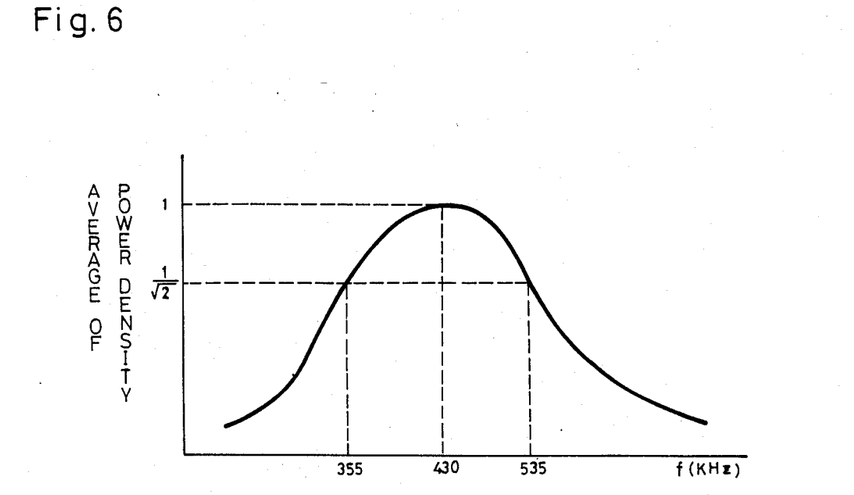
FIG. 6 is a graph showing the frequency spectrum of data signal.

The data signal $S_0$ detected by the pickup 1, as shown in FIG. 6, has the frequency component of about 400 to 500 kHz at both sides of about 430 kHz (half width; lower limit 355 kHz and upper limit 535 kHz). This is based on the coding system of compact disc digital audio system and the frequency component at the peak 430 kHz is the signal corresponding to magnitude of 5 bits: As a result, continuously, the disc 2 reproduces the frequency component of 430 kHz with probability and at a large percentage of generation, whereby the motor shall be driven and controlled paying attention to the 430 kHz frequency spectrum.

Next, explanation will be given on operation of the invention during the starting, rotation at constant linear speed, and stop of the motor and speed variation thereof.

(i) When the motor starts

Now, when the disc 2 stops its rotation and the play key 17 is operated to reset the flip-flop 16 and the play condition is stored, since the motor does not yet rotate, the disc 2 generates no data signal $S_0$, or even if detected, the frequency is low not to obtain data, whereby the frame synchronous signal cannot be extracted. Hence, since the flip-flop 91 is reset as shown in FIG. 4, the output of lock detector 8 is given to the selector 23 to set the dividing ratio "16" of ROM 21 in the programmable divider 19. At the same time, NAND gate 13 and 14 are given signals of logic "0" and "1" and the data signal reproduced from the disc 2 is in condition of being sent out from the switching control circuit 12. Since the phase comparator 11 is not given data signal $S_0$, or even if given, the frequency is low, so that its output is sent out to increase the number of rotations of motor 28, thus starting it.

(ii) When the motor is rotating at constant linear speed

The data signal detected by the pickup 1 following the start of motor 28 and divided into sixteen by the dividing data "16" of divider 19 is given to the phase comparator 11. The divider output based on the coding system of compact disc digital audio system, that is, the divided output of divider 19 is still lower than the reference signal of 27 kHz, thereby further increasing the number of rotations of motor 28.

Accordingly, when the disc 2 becomes to be rotatably driven stop by step at constant linear speed and the data signal $S_0$ is given to the demodulated clock signal generator 6, the voltage control oscillator 64 having the follow-up capacity of only several percent with respect to fluctuation of data signal $S_0$ leads to be given data signal $S_0$ in a range of follow-up capacity, and subsequently the demodulated clock signal generator 6 generates the demodulated clock signal $S_1$ synchronized with the data signal $S_0$. Then, in the lock detector 8 shown in FIG. 4, the data signal $S_0$ is given successively to the shift register 81 on the basis of the demodulated clock signal $S_1$, the coincidence output "CO" of frame synchronous signal by the coincidence circuit 82 supplies the logic "1" output to AND gate 90, the OR gate 85 sets the predetermined numbers to the programmable down counters 83 and 84, and the down count outputs thereof set the flip-flop 87. Then, AND is effected so that the output of AND gate 90 sets the flip-flop 91, whereby the lock detector 8 outputs the signal of logic "1". Hence, the dividing ratio data "160" of ROM 22 is read out from the selector 23, the same is set in the programmable divider 19, and the output of switching control circuit 12 is switched to send out the demodulated clock signal $S_1$.

Therefore, the signal of 27 kHz: 4.3218 MHz divided into 160, is given from the divider 19 to the phase comparator 11 to thereby carry out phase comparison with the reference signal of 27 kHz.

Figure 7:
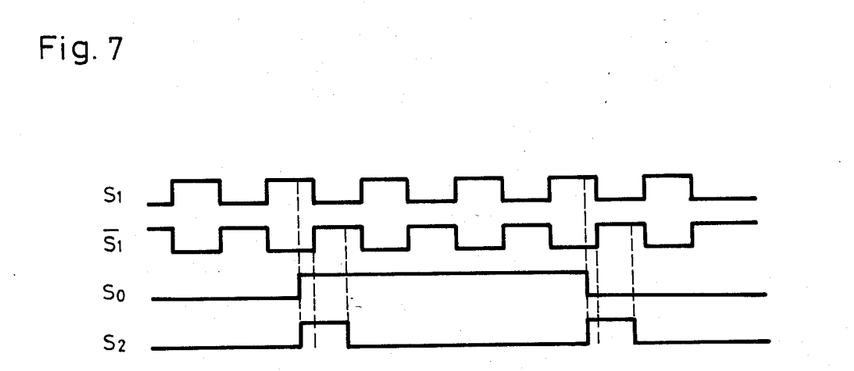
FIG. 7 is a wave form chart of each component at the demodulated clock signal generator for explanation of the invention.

At this time, when the motor 28 for driving the disc 2 rotates at an improper number of rotations, for example, when the rotational speed somewhat lowers, for example, as shown in FIG. 7 the phase of data signal detected by the pickup 1 shifts rightwardly, so that the frequency of demodulated clock signal becomes not coincident with 4.3218 MHz due to synchronization with data signal $S_0$.

Hence, in this invention, the phase comparator 11 compares the output of voltage control oscillator 64 with that of reference oscillator 9 comprising a quartz oscillator so that the motor drive circuit 27 controls corresponding to the comparison error output the number of rotations of motor 28 driving the disc 2 to thereby allow the demodulated clock signal to coincide with the reference signal of 4.3218 MHz from the reference oscillator 9. In other words, control of number of rotations of motor 28 for proper length of data signal $S_0$ detected by pickup 1 means that the number of rotations of the same is controlled to keep constant the linear velocity. Thus, the demodulator 5 is given the demodulated clock signal $S_1$ of 4.3218 MHz in synchronism with data signal $S_0$, length of data signal $S_0$ detected by the pickup 1 being detected to be demodulated in binary digit data.

(iii) When the motor stops

Next, upon operating the stop key 18 to finish the musical performance, the flip-flop 16 is set, its Q output of logic "1" being given to the switching control circuit 12 through OR gate 30. Consequently, the demodulated clock signal $S_1$ of demodulated clock signal generator 6 is sent out from the output of switching control circuit 12. Also, the operation of stop key 18 sets to the programmable divider 19 the dividing ratio; logic "100" from ROM 20. While, the programmable divider 19 feeds to the phase comparator 11 the output of voltage control oscillator 64 in multivibration in the neighborhood of 4.3218 MHz, that is, the divided output of 43 kHz of 100-divided demodulated clock signal $S_1$ of demodulate clock signal generator 6. The frequency of 43 kHz, however, is leading at the phase and frequency far from the reference signal of 27 kHz and equivalent to rapid velocity of motor 28, so that the phase comparator 11 generates error voltage for reducing the velocity of the same, whereby the motor 28 is rapidly reduced in the velocity to be equivalent to the braking action. The voltage control oscillator 64 follows the lowered data signal to lower to the lower limit of the range of follow-up capacity, but the value is several percent of the central frequency, for example 4 MHz, so that the divided output has a higher level in comparison with the reference value, thereby further exerting the braking action to rapidly put the motor in the stop condition.

(iv) When the motor velocity varies

Next, explanation will be given on fluctuation of the motor velocity by some factors (in a case of lacking the information bit on the disc: especially the burst error over the error correction capability or vibrations to disturb rotation of disc).

When the motor 28 velocity varies and the voltage control oscillator 64 at the demodulated clock signal generator 6 loses its follow-up capability with respect to fluctuation of data signal $S_0$, the output of lock detector 8 for detecting the constant speed rotation of motor 28 becomes logic "0". As a result, the output of switching control circuit 12 is put in condition of outputting the data signal $S_0$, the selector 23 selects ROM 21, and the dividing data "16" is set in the programmable divider 19. Hence, the phase comparator 11 is given the output of data signal $S_0$ divided into "16" from the divider 19 and phase-compared with the reference signal of 27 KHz to thereby rotatably control the disc 2 at constant linear velocity until the voltage control oscillator 64 reaches the range of followup capability.

In addition, the embodiment is constructed to change the dividing ratio of the divider which devides the output of switching control circuit 12, which may alternatively be constructed to change the dividing ratio of divider to divide the output of reference oscillator.

Also, in the embodiment, the frame synchronous signal in data signal detected from the disc is detected to detect the motor in constant velocity rotation, which is effective in the large scale integrated circuit. The frequency of 430 kHz: the mean output of data signal on the basis of coding system of compact disc digital audio system, is detected from the high frequency amplifier 3 through a means, such as a filter, which, when in use as the lock detector indicating the motor in constant speed rotation, is simple because of no particular extraction of synchronous signal.

The first embodiment of the invention, as abovementioned, has performed rotational velocity control of motor during (i) the starting, (ii) rotation at constant linear velocity, (iii) stop and (iv) variation of rotational velocity of motor. For starting the motor, the data signal reproduced from the disc is compared in phase with the frequency of reference oscillator, and paying attention to the frequency spectrum of 430 kHz, the mean output on the basis of coding system of compact disc digital audio system, the frequency spectrum is divided by a proper value and phase-compared with the divided output of reference oscillator, whereby the rotation of motor is controlled at the predetermined linear velocity, the accurate data signal can be extracted from the disc, and during the motor rotation at constant speed the demodulated clock signal synchronized with the data signal is phase-compared with the reference signal of reference oscillator, thereby controlling the disc to be driven at constant linear velocity.

Here, it is for solving the following problems to switch the input of the phase comparator when the motor starts and rotates at constant linear velocity (i) The voltage control oscillator constituting the demodulated clock signal generator, which has the follow-up capability only of several percent with respect to the central frequency, cannot follow large fluctuation of motor speed during the starting.

(ii) Although the disc rotates at constant linear velocity in phase comparison of the frequency spectrum of 430 kHz on the basis of coding system of compact disc digital audio system with the reference signal, the rotation fluctuation of motor is larger than drive of motor by the phase comparison of demodulated clock signal with the reference signal, whereby there is a fear of exerting a bad influence upon the reproduction characteristic.

(iii) Since the voltage control oscillator, as described in Item (i), has several % follow-up capability with variation of data signal (for example, ±200 kHz with respect to the central frequency of 4.3218 MHz), when the data signal during the constant speed rotation of disc is largely disturbed by some factors (for example, a lack of information bit on the disc, burst error, or vibrations to disturb the rotation of disc), the disc escapes from the range of follow-up capability of voltage control oscillator not to keep its rotational control in the predetermined number of rotations. The above problems have been involved in the first embodiment.

Hence, the first embodiment of the invention uses the switching control circuit 12, thereby having solved all the above problems.

Figure 8:
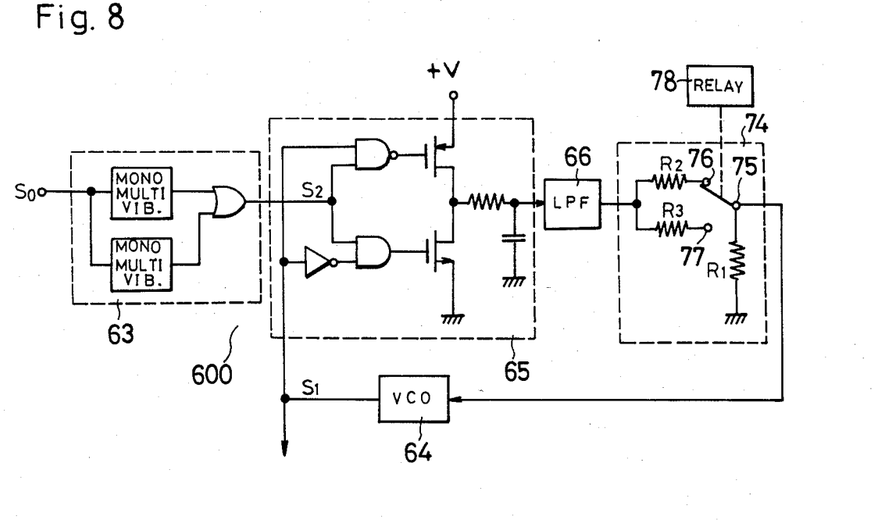
FIG. 8 is a block diagram of an improved demodulated clock signal generator of the invention in FIG. 2.

Next, explanation will be given on that in a case where the voltage control oscillator has the follow-up capability with respect to variation of data signal $S_0$, the demodulated clock signal $S_1$ in synchronism with data signal is phase-compared with the output of reference oscillator 9 by the phase comparator 11, thereby enabling the disc 2 to be driven at constant linear velocity including the starting of motor. An improved demodulated clock signal generator 600 is shown in FIG. 8, in which reference numeral 74 designates a voltage divider connected to the output line of low-pass filter 66, the voltage divider 74 comprising a resistance $R_1$ grounded at one end and having at the other end a movable contact 75, and resistances $R_2$ and $R_3$ having fixed contacts 76 and 75 and disposed in parallel to the output line of low-pass filter 66. The resistance value is set to be $R_2 < R_3$ and a relay 78 energized by the lock detection output from the lock detector 8 is adapted to switch the contact 75 toward the resistance $R_3$. Hence, the voltage control oscillator 64, when the motor 28 starts, is sufficiently largely controlled by a relatively small resistance $R_2$ and partial voltage $(R_1/R_1+R_2 \cdot V)$ by resistance $R_1$, and successively switched to relatively larger resistance $R_3$ corresponding to the switching signal from lock detector 8, thus operating at small amplitude $(R_1 < R_1 + R_3 \cdot V)$.

Figure 9:
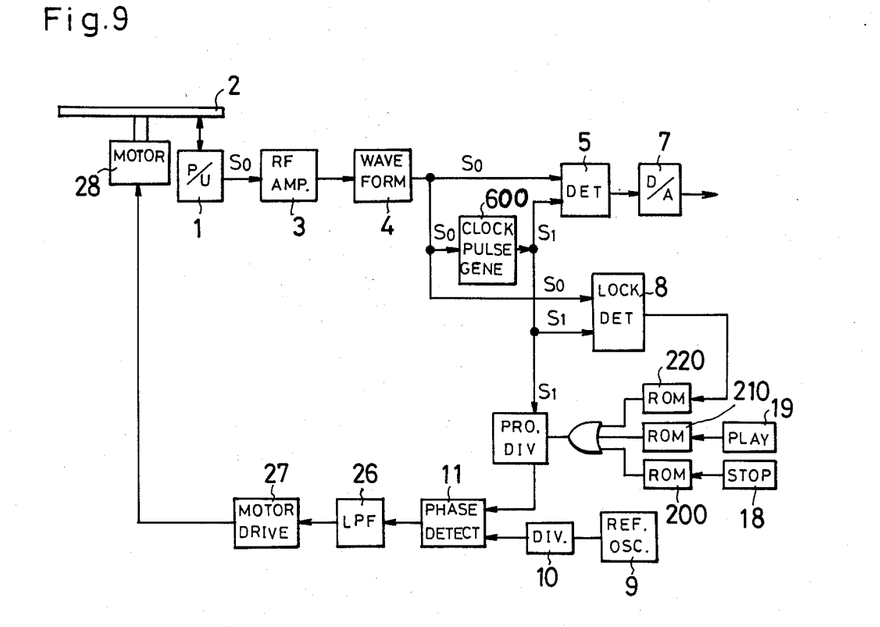
FIG. 9 is a block diagram of a second embodiment of the motor velocity control circuit of the invention.

FIG. 9 is a block diagram of a motor speed control circuit using an improved demodulated clock signal generator 600, in which the components identical with those in FIG. 1 are designated by the same reference numerals. Reference numeral 210 designate ROM to which the dividing ratio data "180" is set, so that a play key 17 is operated to read out the output to be set in the programmable divider 19. 200 designates a ROM to set the dividing ratio data "100" so that a stop key 18 is operated to set the dividing ratio "100" in the divider 19.

In such construction, now the dividing ratio data "180" set to ROM 210 is set to the programmable divider 19 by operation of play key 17 so that the output of voltage control oscillator 64 under multivibration in the neighborhood of 4.3218 MHz is divided by the dividing data "180". From 4.3218 MHz ÷ 180 ≈ 24 kHz, the frequency and phase are logging from the dividing output 27 kHz of reference oscillator 9, whereby the phase comparator 11 outputs signal to increase the number of rotations of motor 28.

In addition, at this time error voltage larger in variation width than the phase comparator 11 is applied to the motor 28 to rotatably drive the disc 2, in which resistance at the voltage divider 74 at demodulated 600 is smaller one R$_2$ so that the variation width is large, whereby the voltage control oscillator 64 is controlled to follow up the variation. Next, the motor 28 rotates to rotate the disc 2 to thereby detect the synchronous signal of data signal S$_0$, and upon sending out the lock detection output "1" from the lock detector 8, the dividing ratio data "160" from ROM 220 is given to the frequency divider 19. Hence, a signal of 27 kHz is obtained from the frequency divider 19 to carry out phase comparison. In this case, when the motor 28 rotates at the predetermined speed, the output of frequency divider 19 is about equal to the reference signal so that the phase comparator 11 generates no error output, but is the same rotates out of the predetermined speed, the demodulated clock signal frequency generated by the demodulated clock signal generator 600 shifts from the predetermined 4.3218 MHz, whereby error voltage corresponding to the phase difference is generated from the phase comparator 11 to control the motor 28. The speed change of motor 28 restores the demodulated clock signal frequency to the predetermined 4.3218 MHz and the speed control of the same continues until no error output is generated from the phase comparator 11, thus carrying out the phase comparison constantly during the reproduction by the disc 2 and controlling the motor 28 at constant linear speed.

Next, when the stop key 18 is operated after the performance, ROM 200 feeds the dividing ratio "100" into the frequency divider 19 to rapidly lower the speed of motor 28 to be equivalent to when subjected to the braking action, thus instantaneously stopping the motor 28 and keeping it stationary.

Modified embodiments of the invention will further be descrbied.

The aforesaid embodiment performs the phase comparison demodulated clock signal with the reference signal to control the motor to be driven at constant linear speed from the starting, in which the phase comparison of data signal S$_0$ reproduced from the disc with the reference signal can do so. Next, explanation will be given on such drive control in accordance with the drawings.

Figure 10:
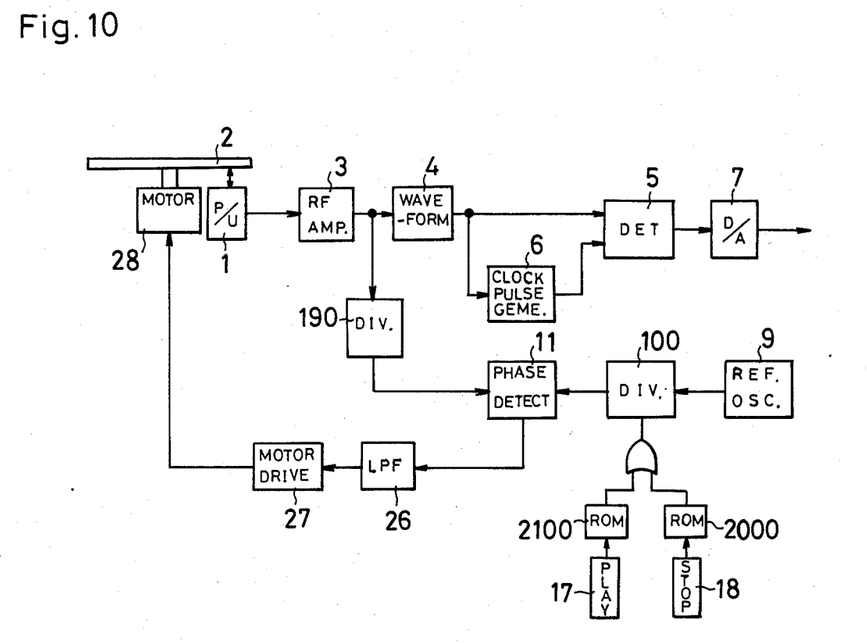
FIG. 10 is a block diagram of a third embodiment of the same of the invention.

A third embodiment of the invention is shown in FIG. 3, in which reference numeral 190 designates a frequency divider which is given the data signal S$_0$ output from the high frequency amplifier 3 whose dividing ratio now is set to "16", 100 designates a frequency divider which divides the output of reference oscillator 9 composed of a quartz oscillator generating the reference oscillation signal of 4.3218 MHz and is constituted to change the dividing ratio during the play and the stop, and 2100 and 2000 designate ROMs set thereto with the dividing ratio data of frequency divider 100, ROM 2100 being adapted to feed therefrom the dividing ratio data "160" into the frequency divider 100, and the play key 17 is operated to set the data to the frequency divider 100. Furthermore, the dividing ratio data "1600" is set to ROM 2000 and set to the frequency divider 100 by operating the stop key 18 so that the dividing ratio of divider 100 is set hormally to "160", and a frequency divider 190 outputs the reference signal of 27 kHz.

Next, explanation will be given on operation of the third embodiment constructed as foregoing. At first, upon operating the play key 17, ROM 2100 feeds the dividing ratio data of "160" into the frequency divider 100, and the reference signal of 27 kHz comprising the reference signal of 4.3218 kHz divided in 160 is given from the divider 100 to the phase comparator 11, but since the disc 2 is not yet rotated, the phase comparator 11 is not given the divided output of data signal S$_0$ from frequency divider 190, but output an error signal to increase the number of rotations of motor 28, whereby the motor drive circuit 27 rapidly increases the number of rotations of the same to obtain the early rise time. Accordingly, the data signal S$_0$, when the data signal S$_0$ is detected by the pickup 1 due to rotation of disc 2 following rotation of motor 28, the phase comparator 11 is given the signal of about 27 kHz of data signal S$_0$ 16-divided by the frequency divider 190 to thereby carry out phase comparison between the signal of 27 kHz and the reference signal. In this case, when the speed of motor 28 reaches the predetermined value, the output of frequency divider 190 is about equal to the reference signal so that no error output is generated by phase comparator 11, but when out of the predetermined speed, the data signal S$_0$ output from the frequency divider 190 shifts from 27 kHz, whereby the motor 28 is controlled by error voltage corresponding to the phase difference and generated from phase comparator 11, the speed control of motor 28 being carried out until the speed change thereof to cease generation of error output from the phase comparator 11, thus constantly performing the phase comparison during the reproduction by the disc 2 to thereby control the motor 28 at constant linear speed.

Next, when the stop key 18 is operated after the performance of disc 2, ROM 2000 feeds the dividing ratio data "1600" into the frequency divider 100, whereby the output of 27 kHz is obtained from the frequency divider 100 and given to the phase comparator 11, at which time the output of frequency divider 190 is of 27 kHz and leads in phase with respect to the reference signal and equivalent to high speed of motor 28, whereby the motor 28 is rapidly reduced in the speed to be equivalent to the braking action applied thereto, thus instantaneously stopping the motor and keeping it stationary.

At this time, the output of frequency divider 190 is lowered by the frequency of data signal S$_0$ detected by pickup 1 lowering following the reduced rotational speed, but since random pulses are generated not to make the output of divider 190 complete zero, the dividing ratio of frequency divider 190 when the motor stops, need only be decided in consideration of the random pulse frequency.

In addition, in this embodiment, the dividing ratio of divider 100 during the motor stop is set larger to lower the reference signal, but the reference signal may be cut off. Also, this embodiment changes the dividing ratio of divides for dividing the output of reference signal, which may alternatively be constructed to change the same of divider to divide the output of data signal.

Figure 11:
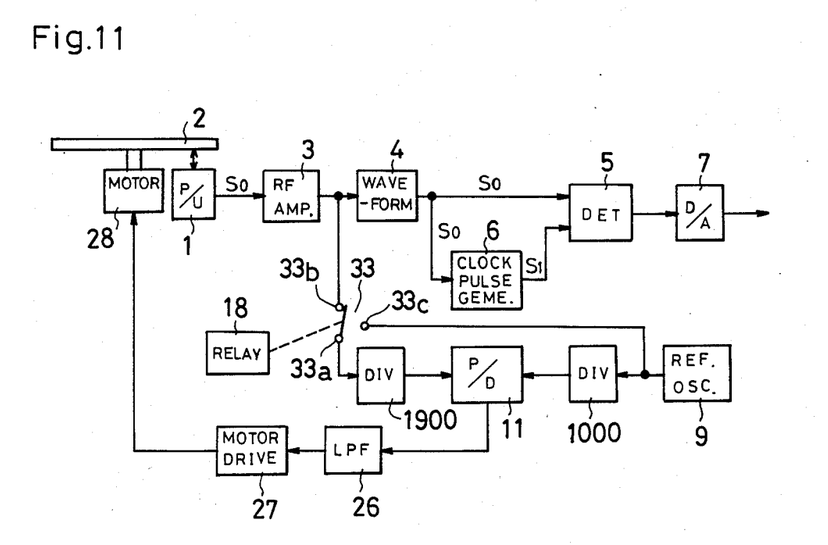
FIG. 11 is a block diagram of a modification of the third embodiment of the invention in FIG. 10.

Furthermore, the use of frequency dividers 1000 and 1900 of the preset dividing ratio data can control the motor at the starting, constant speed rotation, and stop, which is shown in FIG. 11, in which the frequency divider 1900 which is given the data signal S$_0$ output from the high frequency amplifier 3 through a changeover switch 33 and now sets the dividing ratio to "16". The frequency divider 1000 divides the output of reference oscillator 9 comprising a quartz oscillator generating reference oscillation signal of 4.3218 kHz and now sets the dividing ratio to 160 and is generating the reference signal of 27 kHz. Also, the output of reference oscillator 9 is given to the other stationary contact 33*c* at the changeover switch 33 and then to the divider 1900. The changeover switch 33 is switched always to one stationary contact 33b and adapted to be switched to the other stationary contact 33c by operation of stop key 18. In a modified embodiment of the third embodiment constructed as foregoing, a play key (not shown) at first is operated and the frequency divider 1000 feeds into the phase comparator 11 the reference signal of 27 kHz comprising the reference signal of 4.3218 MHz divided into 160, but since the disc 2 is not rotated, the phase comparator 11 is given no divided output from divider 1900, so that the phase comparator 11 generates an error output to increase the rotation of motor 28, whereby the number of rotations thereof is rapidly increased by the motor drive circuit 27 and the early rise time is obtained, thus driving the disc 2 at constant linear velocity. Next, when the performance of disc 2 is intended to finish, the stop key 18 is operated to switch the one contact 33a to the other stationary contact 33c at the changeover switch 33a, whereby the reference signal of reference oscillator 9 is 16-divided to be of 270 kHz. Hence, the phase comparator 11 generates error voltage so as to lower the motor 28 speed, thereby rapidly reducing the speed of motor 28 and putting it equivalent to the braking action applied thereto, thus instantaneously stopping the motor 28 and keeping it stationary. In addition, the dividing ratio of each frequency divider 1000 or 1900, which is set to 160 or 16, is not limited thereto and need only be decided corresponding to the frequency for phase comparison.

As seen from the above, the motor speed control circuit of the invention comprises the switching control circuit for switching the data signal detected by the pickup to the divided output and demodulated clock signal synchronized with the data signal, the reference oscillator for generating the reference oscillation signal, phase comparison means comparing in phase the output of reference oscillator with that of switching control circuit, and means for controlling the motor to be driven corresponding to an error output from the phase comparison means, so that when the motor starts, the output dividing the data signal detected by the pickup is phase-compared with the output of reference oscillator and the error output controls the number of rotations of motor, whereby the rotation of disc can be controlled to be driven at constant linear velocity. Paying attention to the frequency spectrum of data signal on the basis of coding system of the compact disc digital audio system, the data signal detected by the disc, when the motor starts, is divided into proper values, the divided output being phase-compared with the reference signal, thereby enabling the starting of motor. As a result, the number of rotations of motor is included sufficiently within a range of several percent of the predetermined number of rotations of the same at constant linear velocity thereof, whereby the phase comparison of the demodulated clock signal in synchronism with the data signal with the reference signal can drive the motor at constant linear velocity.

Therefore, there is no need of separately providing the circuit for driving the motor at about constant speed and the circuit for controlling the motor to be driven at constant linear velocity, and the switching control circuit switches the data signal detected properly from the disc and given to the phase comparison means and the demodulated clock signal synchronized with the data signal to enable the start and drive of the motor at constant linear velocity, thereby facilitating the digital process and integration. Also, the disc can be driven by itself rotation to near the predetermined linear velocity rotation, and when it reaches the neighborhood thereof, the switching control circuit automatically switches the data signal to the demodulated clock signal smaller in the fluctuation range so that the demodulated signal is phase-compared with the reference signal, thereby expecting the rotation of motor of less variation and improving the reproduction characteristic.

In case that the disc during the performance abnormally shifts from the center from some factors, or the data signal largely varies, the voltage control oscillator at the demodulated clock signal generator shifts from the phase synchronizing loop at the limit of follow-up capability. In this case, when the output given to the phase comparator from the switching control circuit is switched to the divided output of data signal detected from the disc, the motor is controlled in rotation by the divided output of frequency spectrum of data signal, whereby the number of rotations of motor enters with ease into the range of several percent of the predetermined number of rotations thereof at constant linear velocity. Hence, the motor speed control circuit of the invention is of extremely high reliability.

Also, the dividing ratio of the frequency divider for the signal to be phase-compared is changed when the motor starts, rotates at constant speed and stops, thereby enabling the quick rise time of motor and the rapid stop thereof. The frequency to be in phase comparison is set out of the audio frequency range to thereby be advantageous in that the reproduction characteristic is free from a bad effect. Furthermore, since the synchronous signal in the disc is not used for drive control of motor at constant linear velocity, the disc is controllable to be driven at constant linear speed independently of lack of synchronous signal in the disc.

INDUSTRIAL APPLICABILITY

This invention is applicable to a speed control circuit for a motor to rotate a rotary medium at constant linear velocity. Paying attention to that the data signal reproduced from the disc on the basis of coding method of compact disc digital audio system is distributed over about 400–500 kHz around the frequency component of about 430 kHz frequency component (in other words, the peak of 430 kHz frequency component corresponding to magnitude of 5 bits of reference signal), the embodiments of the invention phase-compare the reference signal with the data signal reproduced from the disc and including the frequency spectrum reproduced with high generation percentage in probability, thereby having controlled the motor to be driven at constant linear velocity.

This is usuable entirely to the motor by which the rotary medium, on which the data signal is previously recorded at constant linear velocity, is rotatably controlled thereat when reproduced. In other words, the data signal recording method having the peak component is expectable of rotational control at constant linear velocity when reproduced.

Hence, the invention is applicable to the rotary medium, such as video disc, on which data signal is recorded at constant linear velocity when recorded.

Furthermore, this invention drives and controls the motor by the phase comparison means in much a manner that the demodulated clock signal of 4.3218 MHz corresponding to the minimum information bit in synchronism with the data signal reproduced by the disc corresponds to the reference frequency signal (of 4.3218 MHz) of reference oscillator in a ratio of 1 to 1. However, for the rotary medium on which the data signal to be recorded on the disc is recorded to be integer times the minimum information bit, the reference frequency signal corresponding to the above information bit is set, the demodulated clock signal in synchronism with data signal reproduced from the rotary medium is constituted by the oscillator in multivibration in the neighborhood of the reference frequency signal, phase comparison means controls in comparison the demodulated clock signal in synchronism with the data signal demodulated by the oscillator so that the clock signal corresponds at a ratio of 1 to 1 to the reference frequency signal of the reference oscillator, and the control output of the comparison means drives the motor, thereby enabling rotational control of the rotary medium at constant linear velocity.

Accordingly, the rotary medium on which the data signal is recorded at integer times the minimum information bit is rotatably controllable at constant linear velocity by the circuit of the invention.

Furthermore, the rotary medium having the signal recorded thereon at integer times the minimum information bit and data signal recording method having the frequency component of the peak component, when the number of rotations of motor largely varies, or in some cases, phase-compares the data signal with the reference signal paying attention to the peak component at the recorded data signal to thereby drive-control the motor and rotatably control the rotary medium at constant linear velocity. Also, when the number of rotations of motor varies a little, or in some cases, the demodulated signal synchronized with the recorded data signal is phase-compared with the reference frequency signal to thereby drive-control the motor and rotatably control the rotary medium at constant linear velocity. Such method can further preferably rotatably control the rotary medium at constant linear velocity.

Hence, the rotary medium recording thereon data signal integer times as large as the minimum information bit by use of the recording method having the frequency component of the peak component is rotatably controllable at constant linear velocity.

What is claimed is:

1. A motor velocity control circuit for a motor driving a disc of a constant linear velocity system, characterized in that said circuit comprises a demodulated clock signal generating means for generating a demodulated clock signal in synchronism with a data signal detected from said disc, a switching control means for switching and outputting said demodulated clock signal output from said demodulated clock signal generating means and said data signal detected from said disc, a reference oscillator, a phase comparison means which adopts the output signal of said reference oscillator as the reference signal and the demodulated clock signal or data signal selected by said switching control means as the comparison signal, thereby phase-comparing both said signals, and a means for driving and controlling said motor corresponding to an error output from said phase-comparison means.

2. A motor velocity control circuit according to claim 1, characterized in that said switching control means, when said motor starts, selects said data signal to be the comparison signal and when said motor rotates at constant linear velocity and stops, selects said demodulated clock signal to be the comparison signal.

3. A motor velocity control circuit according to claim 1, characterized by providing a first frequency dividing means which divides said demodulated clock signal or data signal to produce said comparison signal and a second frequency dividing means which divides the output signal of said reference oscillator to produce the reference signal, so that when said motor starts, rotates at constant linear velocity, or stops, a dividing ratio of at least one of said first and second frequency-dividing means is adapted to change.

4. A motor velocity control circuit according to claim 1, characterized in that the frequency of the comparison signal given to said phase comparison means is set larger than the audio frequency and smaller than the motor limit response frequency.

5. A motor velocity control circuit for a motor to drive a disc of a constant linear velocity system, comprising a demodulated clock signal generating means for generating a demodulated clock signal in synchronism with a data signal detected from said disc, said demodulated clock signal generating means including a voltage controlled oscillator, responsive to a control voltage, and a switchable voltage divider, said voltage controlled oscillator being adapted to receive said control voltage from said switchable voltage divider switching to provide a first amplitude voltage when said motor starts, and provide a second amplitude voltage smaller than said first amplitude when said motor is operating near a constant linear velocity, reference oscillator means for providing a reference signal, phase comparison means which takes as the comparison signals said demodulated clock signal and as the reference signal said reference signal for phase-comparing both said signals, and means for controlling said motor to be drvien in accordance with an error signal output from said phase comparison means.

6. The motor velocity control circuit according to claim 5, further comprising first frequency dividing means having a first dividing ratio for dividing said demodulated clock signal and providing said divided demodulated signal as said comparison signal and second frequency dividing means having a second dividing ratio for dividing said reference signal, said first and second dividing ratios having values that change when said motor starts, stops or is rotating at a constant linear velocity.

7. A motor velocity control circuit according to claim 5, characterized in that the frequency of said comparison signal given to said phase comparison means is set larger than the audio frequency and smaller than the motor limit response frequency.

8. A motor velocity control device for controlling a motor used to drive a disc, said disc having a data signal thereon, said data signal being comprised of signals of a plurality of frequencies having a predetermined central frequency when said disc is driven at a constant linear velocity, said control device comprising:
   a reference oscillator for providing a reference signal corresponding to said central frequency;
   signal detection means for providing a comparison signal derived from a signal detected from said data signal; and
   phase comparison means for phase comparing said reference signal and said comparison signal for providing an error signal according to the difference between said comparison signal and said reference signal; and motor drive means for driving said motor according to said error signal;

wherein said motor is driven to cause said reference frequency to coincide with said comparison signal, said motor thereby rotating in correspondence to said error signal from said phase comparison means and said disc being controlled to rotate at a constant linear velocity.

9. A motor velocity control circuit according to claim 8, characterized in that the frequency of the comparison signal given to said phase comparison means is set larger than the audio frequency and smaller than the motor limit response frequency.

10. The motor velocity control circuit according to claim 8 wherein:
said signal detection means comprises first freqency dividing means having a first frequency dividing ratio for dividing said signal detected from said disc, for providing said comparison signal;
said motor velocity control circuit further comprises:
second frequency dividing means having a second frequency dividing ratio coupled to said reference oscillator for providing said reference signal; and
said first and second dividing ratios have values selected according to whether said motor starts, stops or is rotating said disc at a constant linear velocity.

11. A motor velocity control circuit for controlling a motor used to drive a disc, said disc having a data signal thereon, comprising:
a reference oscillator for providing a reference signal;
signal detection means for providing a comparison signal corresponding to a signal detected from said data signal;
phase comparison means for phase comparing said reference signal and said, comparison signal;
wherein said motor starts in correspondence to an error signal output from said phase comparison means and is controlled to rotate at a constant linear velocity;
first frequency dividing means for receiving said detected data signal and for dividing said data signal to produce said comparison signal; and
switching means for cutting off said data signal and switching said reference signal to said first frequency dividing means when said motor stops.

* * * * *